(12) United States Patent
Goergen et al.

(10) Patent No.: US 9,538,040 B2
(45) Date of Patent: Jan. 3, 2017

(54) ACTIVE SENSING FOR DYNAMIC SPECTRUM ACCESS

(71) Applicant: UNIVERSITY OF MARYLAND, College Park, MD (US)

(72) Inventors: Nathan Goergen, Baltimore, MD (US); Wan-Yi Lin, College Park, MD (US); K. J. Ray Liu, Potomac, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 13/717,675

(22) Filed: Dec. 17, 2012

(65) Prior Publication Data

US 2013/0159722 A1 Jun. 20, 2013

Related U.S. Application Data

(60) Provisional application No. 61/576,586, filed on Dec. 16, 2011.

(51) Int. Cl.
| | |
|---|---|
| *H04L 29/06* | (2006.01) |
| *H04N 1/32* | (2006.01) |
| *G06F 21/16* | (2013.01) |
| *H04W 16/14* | (2009.01) |
| *G06F 17/30* | (2006.01) |
| *H04N 21/8358* | (2011.01) |

(52) U.S. Cl.
CPC .... *H04N 1/32144* (2013.01); *G06F 17/30743* (2013.01); *G06F 21/16* (2013.01); *H04N 21/8358* (2013.01); *H04W 16/14* (2013.01)

(58) Field of Classification Search
CPC .... H04W 16/14; H04N 1/32144; G06F 21/16; G06F 17/30743; H04L 2209/608
USPC ........................................................ 713/176
See application file for complete search history.

(56) References Cited

U.S. PATENT DOCUMENTS 5,905,800 A * 5/1999 Moskowitz et al. ............ 380/28
7,131,007 B1 * 10/2006 Johnston et al. .............. 713/173
(Continued)

OTHER PUBLICATIONS

Bello, Philip A., Characterization of Randomly Time-Variant Linear Channels, IEEE Transactions on Communications Systems, Dec. 1963, pp. 360-393.
(Continued)

*Primary Examiner* — Hadi Armouche
*Assistant Examiner* — Sher A Khan
(74) *Attorney, Agent, or Firm* — Squire Patton Boggs (US) LLP

(57) ABSTRACT

Various communication systems may benefit from physical layer watermarking. For example, active sensing for dynamic spectrum access may be performed using physical layer watermarking, such as watermarking based on channel effects and/or receiver distortion. A method may include, for example, obtaining an original signal to be transmitted to at least one receiver. The method may also include watermarking the original signal with at least one of authentication data or ancillary data to provide an enhanced signal. The watermarking can include a physical layer watermark. The physical layer watermark can be configured to emulate at least one a channel effect or a receiver distortion. The method can further include transmitting the enhanced signal to the at least one receiver.

23 Claims, 7 Drawing Sheets

(56) References Cited

U.S. PATENT DOCUMENTS

| | | | |
|---|---|---|---|
| 7,904,723 B2* | 3/2011 | Shin et al. | 713/176 |
| 8,565,063 B2* | 10/2013 | Wang | 370/208 |
| 2002/0118859 A1* | 8/2002 | Stone et al. | 382/100 |
| 2002/0164046 A1* | 11/2002 | Walker | G06T 1/0085 382/100 |
| 2005/0180315 A1* | 8/2005 | Chitrapu | H04B 7/2628 370/208 |
| 2005/0226421 A1* | 10/2005 | Briancon | H04L 63/12 380/270 |
| 2006/0171489 A1* | 8/2006 | Ghosh et al. | 375/341 |
| 2006/0200673 A1* | 9/2006 | Zhang | H04L 63/126 713/176 |
| 2006/0218126 A1* | 9/2006 | De Ruijter | G06F 17/30743 |
| 2007/0053325 A1* | 3/2007 | Shin et al. | 370/335 |
| 2007/0121939 A1* | 5/2007 | Olesen et al. | 380/201 |
| 2009/0316682 A1* | 12/2009 | Twitchell, Jr. | H04L 63/12 370/351 |
| 2010/0246825 A1* | 9/2010 | Baras et al. | 380/270 |
| 2012/0275641 A1* | 11/2012 | Al-Omari | G06T 1/0071 382/100 |
| 2013/0117571 A1* | 5/2013 | Petrovic | H04L 9/00 713/176 |
| 2013/0132729 A1* | 5/2013 | Arnold | G06T 1/0071 713/176 |

OTHER PUBLICATIONS

Konstantinides, Konstantinos, et al., "Statistical Analysis of Effective Singular Values in Matrix Rank Determination", IEEE Transactions on Acoustics, Speech, and Signal Processing, vol. 36. No. 5. May 1988, pp. 757-763.
Goergen, Nate, et al., "Authenticating MIMO Transmissions Using Channel-Like Fingerprinting", Electrical and Computer Engineering University of Maryland, College Park, MD, 20742, USA; Full text paper was peer reviewed at the direction of IEEE Communications Society subject matter experts for publication in the IEEE Globecom 2010 proceedings; 6 pages.
Pirak, Chaiyod, et al., "A Data-Bearing Approach for Pilot-Embedding Frameworks in Space-Time Coded MIMO Systems", IEEE Transactions on Signal Processing, vol. 54, No. 10, Oct. 2006, pp. 3966-3979).
Everson, Richard, et al., "Inferring the eigenvalues of covariance matrices from limited, noisy data", IEEE Transactions on Signal Processing, vol. XX, No. Y, Month 1999, 18 pages.
Van De Beek, Jan-Jaap, et al., "On Channel Estimation in OFDM Systems", Div. of Signal Processing, Lulea University of Technology, S-971 87 Luleå, Sweden and Purdue University, School of Electrical Engineering, West Lafayette, IN 47907-1285, USA, 1995 IEEE, pp. 815-819.
3GPP TR 25.943 V7.0.4 (Jun. 2007), Technical Report; 3rd Generation Partnership Project, Technical Specification Group Radio Access Networks; Deployment aspects (Release 7), 15 pages.
Wang, Zhengdao, et al., "Linearly Preceded or Coded OFDM against Wireless Channel Fades?", Dept. Of Elec. and Comp. Eng., Univ. of Minnesota, 200 Union Street SE, Minneapolis MN 55455, USA; Third IEEE Signal Processing Workshop an Signal Processing Advances in Wireless Communicartions,Taoyuan, Taiwan, Mar. 20-23, 2001, 4 pages.
Xiao, Liang, et al, "Using the Physical Layer for Wireless Authentication in Time-Variant Channels", IEEE Transactions on Wireless Communications, vol. 7, No. 7, Jul. 2008, pp. 2571-2579.
Cox, Ingemar J., et al., "Watermarking as communications with side information", Published in the Proceedings of the IEEE, 87, 7, 1127-1141, 1999, 26 pages.
Yu, Paul L., et al., "Physical-Layer Authentication", IEEE Transactions on Information Forensics and Security, vol. 3, No. 1, Mar. 2008, pp. 38-51.
Morimoto, Masakazu, et al., "A Hierarchical Image Transmission System in a Fading Channel", Department of Electrical Engineering, Faculty of Engineering, Osaka University. Osaka 565, Japan, pp. 769-772. Published in 1995.
Wei, Lee-Fang, "Coded Modulation with Unequal Error Protection", IEEE Transactions on Communications, vol. 41, No. 10, Oct. 1993, pp. 1439-1449.
Burbank, Jack L., "Security in Cognitive Radio Networks: The Required Evolution in Approaches to Wireless Network Security", The Johns Hopkins University Applied Physics Laboratory, Laurel, MD 20723, 7 pages. Published in 2008.
Wang, Xianbin, et al., "Transmitter Identification Using Embedded Pseudo Random Sequences", IEEE Transactions on Broadcasting, vol. 50, No. 3, Sep. 2004, pp. 244-252.
Chen, Ruiliang, et al., "Defense against Primary User Emulation Attacks in Cognitive Radio Networks", IEEE Journal on Selected Areas in Communications, vol. 26, No. 1, Jan. 2008, pp. 25-37.
Clancy, Charles, T., et al., "Security in Cognitive Radio Networks: Threats and Mitigation", Electrical and Computer Engineering, University of Maryland, College Park and Laboratory for Telecommunications Sciences, US Department of Defense, pp. 1-8. Published in Dec. 2008.
Goergen, Nate, et al., "Physical Layer Authentication Watermarks Through Synthetic Channel Emulation", Full text paper was peer reviewed at the direction of IEEE Communications Society subject matter experts for publication in the IEEE DySPAN 2010 proceedings; 7 pages.
Shaukat, Rakhshanda, et al., "Threats Identification and their Solution in Inter-Basestation Dynamic Resource Sharing IEEE-802.22", International Conference on Convergence and Hybrid Information Technology 2008, pp. 609-614.
Adams, William Joseph, "Decentralized Trust-Based Access Control for Dynamic Collaborative Environments", submitted to the faculty of Virginia Polytechnic Institute and State University in partial fulfillment of the requirements for the degree of Doctor of Philosophy in Computer Engineering, Mar. 31, 2006, Blacksburg, VA, 146 pages.
Sutton, P.D., et al., "Cyclostationary Signatures for Rendezvous in OFDM-based Dynamic Spectrum Access Networks", Centre for Telecommunications Value-Chain Research (CTVR), University of Dublin, Trinity College, Ireland, pp. 220-231. Published in Jun. 2007.
Chen, Ruiliang, et al., "Ensuring Trustworthy Spectrum Sensing in Cognitive Radio Networks", Bradley Department of Electrical and Computer Engineering, Virginia Polytechnic Institute and State University, Blacksburg, VA, IEEE 2006, pp. 110-119.
Goergen, Nate, et al., "Channel-Like Fingerprinting Overlays for Authenticating OFDM Signals Using Channel Side Information", Electrical and Computer Engineering, University of Maryland, College Park, MD, USA, 9 pages. Published in 2010.
Gandetto, Matteo, et al., "Use of Time-Frequency Analysis and Neural Networks for Mode Identification in a Wireless Software-Defined Radio Approach", EURASIP Journal on Applied Signal Processing 2004:12, 1778-1790, 2004 Hindawi Publishing Corporation, pp. 1778-1790.
Yücek, Tevfik et al., "Spectrum Characterization for Opportunistic Cognitive Radio Systems", Department of Electrical Engineering, University of South Florida, Tampa, FL, USA, pp. 1-6. Published in Feb. 2007.
Yücek, Tevfik et al., "A Survey of Spectrum Sensing Algorithms for Cognitive Radio Applications", Department of Electrical Engineering, University of South Florida, Tampa, FL, USA; IEEE Communications Surveys & Tutorials, vol. 11, No. 1, First Quarter 2009, pp. 116-130.
Schmidl, Timothy M., et al., "Robust Frequency and Timing Synchronization for OFDM", IEEE Transactions on Communications, vol. 45, No. 12, Dec. 1997, pp. 1613-1621.
Fehske, A., et al., "A New Approach to Signal Classification Using Spectral Correlation and Neural Networks", Virginia Polytechnic Institute and State University, Mobile and Portable Radio Research Group, Blacksburg, VA, USA, pp. 144-150. Published in Nov. 2005.

(56) References Cited

OTHER PUBLICATIONS

Akyildiz, Ian F., et al., "NeXt generation/dynamic spectrum access/cognitive radio wireless networks: A survey", Broadband and Wireless Networking Laboratory, School of Electrical and Computer Engineering, Georgia Institute of Technology, Atlanta, GA, USA, Received Jan. 2, 2006; Accepted May 2, 2006; Available online May 17, 2006, at www.sciencedirect.com; Computer Networks 50 (2006), pp. 2127-2159.

Newman, Timothy R., et al., Security Threats to Cognitive Radio Signal Classifiers, Wireless @ Virginia Tech, Virginia Polytechnic and State Institution, Blacksburg, VA, USA and Electrical and Computer Engineering, University of Maryland, College Park, MD, USA, 9 pages. Published in 2009.

Le, Bin, et al., "Modulation Identification Using Neural Networks for Cognitive Radios", Virginia Tech, Virginia Polytechnic and State Institution, Blacksburg, VA, USA, 6 pages. Published in Nov. 2005.

* cited by examiner

US 9,538,040 B2

ACTIVE SENSING FOR DYNAMIC SPECTRUM ACCESS

CROSS REFERENCE TO RELATED APPLICATIONS

This application is related to and claims the benefit of U.S. Provisional Patent Application No. 61/576,586 filed Dec. 16, 2011, which is hereby incorporated herein in its entirety by reference.

GOVERNMENT LICENSE RIGHTS

This invention was made with government support under H9823010C0251 awarded by NSA. The government has certain rights in the invention.

BACKGROUND

Field

Various communication systems may benefit from physical layer watermarking. For example, active sensing for dynamic spectrum access may be performed using physical layer watermarking, such as watermarking based on channel effects and/or receiver distortion.

Description of the Related Art

As wireless communication has become a ubiquitous part of every-day life, access to the electromagnetic spectrum has become increasingly competitive. To facilitate efficient use of limited spectral resources, an arbitration method known as Dynamic Spectrum Access (DSA) has been proposed. Wireless Regional Area Networks (WRAN), for example as standardized at Institute of Electrical and Electronics Engineers (IEEE) 802.22, may also include spectrum sensing and shared spectrum technologies. Under IEEE 802.22, limited access to the unused spectrum between Digital Television (DTV) channels, or the white space spectrum, is granted to next-generation wireless broadband equipment. In particular, licensed DTV stations, or primary users, are given explicit first-right-of-access to television spectrum, while broadband users known as secondary users, are allowed access to the shared spectrum only when a primary user is not transmitting. While DSA shows promise in facilitating efficient spectrum access, accurate signal classification may be required to facilitate the robust operation of next-generation wireless radios and the interoperability of DSA equipment.

To ensure efficient use of white space spectrum under IEEE 802.22, spectral allocations can first be tested to guarantee that primary users are not present before secondary users are granted access to an allocation. Since the accurate detection of primary users may be required for correct utilization of the shared spectrum, this issue has become known as the Primary User Authentication (PUA) problem.

Traditional approaches to signal identification involving the computation of statistical properties or cyclostationary features have been proposed. These approaches can be referred to as passive signal characterization methods since the transmitter does not explicitly participate in the detection and classification process, nor does it modify characteristics of its signal to aid the detection and classification process. Classification approaches using these features in DSA scenarios have also been discussed, including machine learning and policy-based classification engines. These works have demonstrated the utility of machine learning approaches in signal classification applications. However, in non-cooperative environments, adversaries can easily manipulate the learning process by fooling passive signal characterization methods, exposing DSA systems to a number of identity-based attacks.

While passive approaches readily admit to low complexity implementations, secondary users may masquerade as primary users by simply mimicking basic features of a primary users' signal. Once a secondary user has been incorrectly classified as a primary user, the user can gain unfettered access to the spectrum. These attacks have become known as Primary User Emulation (PUE) attacks.

SUMMARY

According to certain embodiments, a method includes obtaining an original signal to be transmitted to at least one receiver. The method also includes watermarking the original signal with at least one of authentication data or ancillary data to provide an enhanced signal. The watermarking includes a physical layer watermark. The physical layer watermark is configured to emulate at least one a channel effect or a receiver distortion. The method further includes transmitting the enhanced signal to the at least one receiver.

In certain embodiments, an apparatus includes at least one memory including computer program code and at least one processor. The at least one memory and computer program code are configured to, with the at least one processor, cause the apparatus at least to obtain an original signal to be transmitted to at least one receiver. The at least one memory and computer program code are also configured to, with the at least one processor, cause the apparatus at least to watermark the original signal with at least one of authentication data or ancillary data to provide an enhanced signal, wherein watermarking the original signal includes applying a physical layer watermark, wherein the physical layer watermark is configured to emulate at least one a channel effect or a receiver distortion. The at least one memory and computer program code are further configured to, with the at least one processor, cause the apparatus at least to transmit the enhanced signal to the at least one receiver.

According to certain embodiments, an apparatus includes obtaining means for obtaining an original signal to be transmitted to at least one receiver. The apparatus also includes watermarking means for watermarking the original signal with at least one of authentication data or ancillary data to provide an enhanced signal. The watermarking includes a physical layer watermark. The physical layer watermark is configured to emulate at least one a channel effect or a receiver distortion. The apparatus further includes transmitting means for transmitting the enhanced signal to the at least one receiver.

In certain embodiments, a non-transitory computer-readable medium, encoded with instructions that, when executed in hardware, perform a process. The process includes obtaining an original signal to be transmitted to at least one receiver. The process also includes watermarking the original signal with at least one of authentication data or ancillary data to provide an enhanced signal. The watermarking includes a physical layer watermark. The physical layer watermark is configured to emulate at least one a channel effect or a receiver distortion. The process further includes transmitting the enhanced signal to at least one receiver.

According to certain embodiments, a method includes deriving an original signal received from at least one transmitter. The method also includes deriving a watermark of the original signal. The watermark includes at least one of authentication data or ancillary data to provide an enhanced signal. The watermarking includes a physical layer watermark. The physical layer watermark is configured to emulate at least one a channel effect or a receiver distortion.

In certain embodiments, an apparatus includes at least one memory including computer program code and at least one processor. The at least one memory and computer program code are configured to, with the at least one processor, cause the apparatus at least to derive an original signal received from at least one transmitter. The at least one memory and computer program code are also configured to, with the at least one processor, cause the apparatus at least to derive a watermark of the original signal, wherein the watermark includes at least one of authentication data or ancillary data to provide an enhanced signal. Watermarking the original signal includes applying a physical layer watermark, wherein the physical layer watermark is configured to emulate at least one a channel effect or a receiver distortion.

According to certain embodiments, an apparatus includes determining means for deriving an original signal received from at least one transmitter. The apparatus also includes deriving means for deriving a watermark of the original signal. The watermark includes at least one of authentication data or ancillary data to provide an enhanced signal. The watermarking includes a physical layer watermark. The physical layer watermark is configured to emulate at least one a channel effect or a receiver distortion.

In certain embodiments, a non-transitory computer-readable medium, encoded with instructions that, when executed in hardware, perform a process. The process includes deriving an original signal received from at least one transmitter. The process also includes deriving a watermark of the original signal, wherein the watermark includes at least one of authentication data or ancillary data to provide an enhanced signal. The watermarking includes a physical layer watermark. The physical layer watermark is configured to emulate at least one a channel effect or a receiver distortion.

BRIEF DESCRIPTION OF THE DRAWINGS

For proper understanding of the invention, reference should be made to the accompanying drawings, wherein.

DETAILED DESCRIPTION

Figure 1:
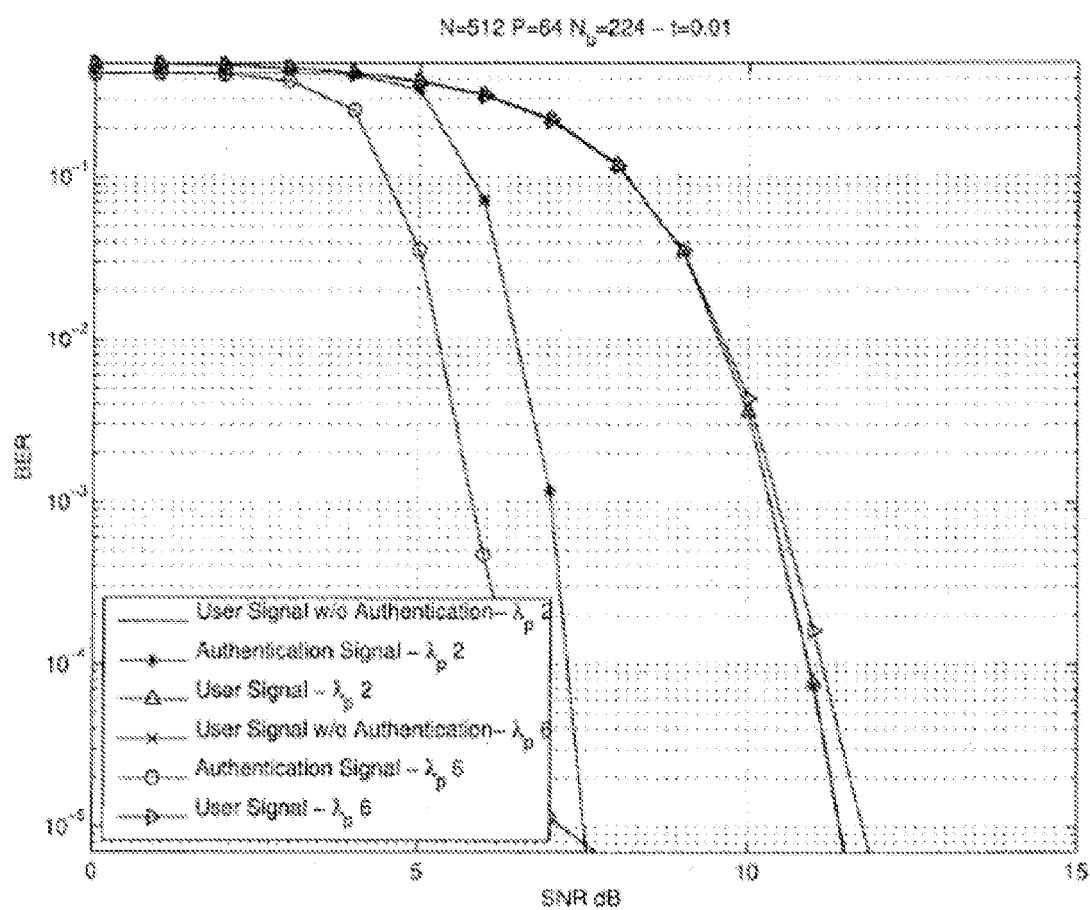
FIG. 1 illustrates original signal and authentication signal bit error rate with and without fingerprint present, various $\lambda_i$, in accordance with certain embodiments.

Certain embodiments provide a physical-layer mechanism for dynamic spectrum access (DSA) applications. The physical layer mechanism can be used in connection with an active approach to spectral sensing. In wireless shared spectrum scenarios, such as the Wireless Regional Area Networks (WRAN) of IEEE 802.22, licensed digital television stations can take a primary user role and may be given explicit first-right-of-access to the television spectrum. When a primary user signal is not present, broadband users are allowed to use shared spectrum, and assume a secondary user role. While various detection and classification techniques using cyclostationary behavior, modulation characteristics, signal bandwidth, and spectral shape may discern users of various roles in DSA theaters, these methods may have limited detection performance, may be susceptible to channel distortions such as multipath effects, and may be vulnerable to malicious Primary User Emulation (PUE) attacks. In PUE attack scenarios, passive spectrum sensing techniques can have poor performance or fail completely, when a secondary user mimics some or all of the features of a primary user.

Thus, certain embodiments embed an explicit unforgeable physical-layer fingerprint signature into wireless transmissions for disambiguating, authenticating users, other purposes, or combinations thereof. When applied to orthogonal frequency-division multiplexing signals in time-varying multipath channels, "channel-like" overlay fingerprint authentication scheme may achieve 99.99 percent detection accuracy and 100 percent classification accuracy, with signal to noise ratio (SNR) as low as 5-6 dB.

Thus, for purposes such as (among others) to prevent malicious behavior, certain embodiments provide a physical authentication mechanism that embeds an explicit and unambiguous physical (PHY) layer message into the signal to be transmitted, providing stronger signal identification and user authentication capabilities than those afforded by passive approaches.

While cryptographic methods at higher layers can authenticate wireless users and prevent interception of transmissions by malicious or unintended users, the ability to authenticate and classify wireless transmissions at the PHY-layer may have a number of advantages over higher-layer approaches. Authentication at the PHY-layer, before demodulating and decoding the signal, can prevent wasteful processing of unintended transmissions and allows nodes to quickly authenticate legitimate users and identify charlatans. Additionally, robust PHY-layer fingerprints may enable user authentication even when the signal itself is unrecoverable due to low signal to noise ratio (SNR) or fading conditions. In general, robust authentication devices can play a crucial role in securing wireless systems against message forgery and the malicious actions of impostors, thereby preventing a number of identity attacks to next-generation wireless system.

Herein, the term "channel-like" can denote a class of fingerprint signals designed to manipulate parameters of the transmitted signal in ways that can be modeled as time-varying channel distortions, such as distortions that are subsequently corrected by the receiver through traditional channel equalization and synchronization methods.

A three faceted approach can be used to create a holistic signal authentication mechanism that can be applied to DSA situations. First, an orthogonal frequency division multiplexing (OFDM) fingerprint overlay embedding scheme can be used to embed a multi-bit, digital message at the PHY-layer, which is broadcast to all users within reception range of the transmission. The message can be broadcast to all users, allowing every user to authenticate the fingerprinted transmission, without any attempt to establish a covert or secret transmission. Secondly, a digital message, embedded using a "channel-like" fingerprinting method, can achieve a bit error rate (BER) much lower than the original signal.

Since multi-bit digital messages can be embedded, BER of the received fingerprint message can be used as a measure of performance. Third, a PHY-layer approach can be combined with existing passive spectrum sensing techniques to create a hybrid spectrum sensing metric that outperforms passive sensing techniques, when passive techniques are used alone.

In an OFDM system, as one example of a communication system, the transmission is subjected to a linear time-domain channel response g(t), which may be given as $$g(t) = \sum_c A_c(t) \delta(t - \Delta \tau_c), \quad (1)$$

where $\Delta$ is the sampling interval, $\tau_c$ are the delays for each channel component, and $A_c(t)$ are the complex valued delay-spread gains at time t for multipath component c. The OFDM system can be modulated using an N-point discrete-time inverse Fourier transform ($IDFT_N$), and then subsequently demodulated using an N-point discrete-time Fourier transform ($DFT_N$). The matrix representation of a received OFDM symbol vector, augmented with our extrinsic fingerprint function $f=[f_0 \ f_1 \ \ldots \ f_{N-1}]^T$ and its matrix equivalent $F^{(N \times N)}=\text{diag}([f_0 \ f_1 \ \ldots \ f_{N-1}])$, becomes $$y = gWFX + n = u_{x,f,g} + n \quad (2)$$

where $y=[y_0 \ y_1 \ \ldots \ y_{N-1}]$ is the received band-limited signal vector with elements $y_n \in C$, the matrix $X=\text{diag}([x_0 \ x_1 \ \ldots \ x_{N-1}])$ is of size $C^{(N \times N)}$, $x=[x_0 \ x_1 \ \ldots \ x_{N-1}]$ are the data symbols to be fingerprinted and transmitted, W is a $C^{(N \times N)}$ IDFT-matrix with elements $$W_N^{nk} = \frac{1}{\sqrt{N}} e^{j 2\pi \frac{nk}{N}},$$

using row index n=0, ..., N−1 and column index k=0, ..., N−1, the vector $g=[g_0 \ g_1 \ \ldots \ g_{N-1}]$ is determined by the cyclic equivalent of sinc-functions which will be described shortly, $n=[n_0 \ n_1 \ \ldots \ n_{N-1}]$ is the frequency-domain representation of complex Gaussian noise, and $u_{x,f,g}$ is the received noiseless OFDM transmission. The vector g is the observed channel impulse response after sampling the frequency response of g(t), where each element $g_i \in g$ defined as $$g_i = \sum_c A_c e^{j \frac{\pi}{N}(i+(N-1)\tau_c)} \frac{\sin(\pi \tau_c)}{\sin\left(\frac{\pi}{N}(\tau_c - i)\right)},$$

are cyclic sinc functions with $g \in C^N$, which is the impulse response of a band-limited channel when sampling the frequency response of g(t).

The elements of g can be independent Rayleigh block-stationary, while the fingerprinting function f can also be designed to be block-stationary. The fingerprinted signal x is a composite signal composed of two components: the user payload data and embedded preamble and pilot signals used for channel estimation and equalization. Both intrinsic and extrinsic distortions can be removed via adaptive equalization in a manner identical to the removal of intrinsic distortions alone, resulting in minimal degradation to the decoded fingerprinted signal. The intrinsic channel response and the extrinsic fingerprint signal can be delineated through an odd-frame/even-frame delivery scheme that serves as a differential modulation mechanism for transmitting the digital authentication message consisting of a number of bits.

Since time-varying channel distortions act as interference when decoding the fingerprint signal, these distortions can be considered in a system according to certain embodiments. The intrinsic time-varying channel response experienced by the OFDM symbol transmitted at time k, i.e. g[k], or its frequency-domain equivalent, $h[k]=DFT_N(g[k])$, can be modeled using a time-variant OFDM channel model. A wide-sense stationary uncorrelated scattering (WSSUS) channel model can, for example, be applied.

The aggregate channel-like distortion experienced by the receiver can be defined as Q[k]=(G[k]WF[k]), where G[k]=diag(g[k]), F[k]=diag(f[k]), and f[k] can be the fingerprinting function applied to a block of P consecutive OFDM transmissions. The block-based fingerprinting function, $F[k] \in C^{(N \times P)}$, can be the matrix-representation of P fingerprinting functions $IDFT_N(f^T[k])$ arranged as columns in F[k] and applied by the transmitter. The matrices Q[k] and H[k] are defined similarly using $q^T[k]$ and $h^T[k]$, respectively.

To effectively combat PUE attacks when a secondary DSA user can mimic all parameters of the transmitted signal y[k], except for the fingerprinting function f[k] (or for other purposes, with PUE attacks being only one possible purpose), the block fingerprint signal F[k] can be designed according to the following principles: the fingerprint signal can be configured to cause minimal degradation to the user data signal, and to the detection of the user data signal, when present; the fingerprint signal can be configured to be detectable in low signal to noise ratio (SNR) conditions, optionally even when the fingerprinted data symbols are unrecoverable; the fingerprint signal can be configured to yield an extremely low probability of detection error, including both miss errors and false alarm errors, for each of the "primary user present" and "secondary user present" hypotheses; and a broadcast authentication message conveyed by the fingerprint function can be configured to be resistant to common attacks, including forgery, modification, and replay.

The fingerprinting function F[l] at time k=l can be designed such that the intrinsic time-varying channel fades and the extrinsic fingerprint data can be delineated via summation, for example, ^Q[l]=^P[l]+K[l], where ^Q[l] is the block estimate of the aggregate time-varying channel distortions, ^P[l] is a low-rank model of the intrinsic time-varying channel fading and K[l] is the extrinsic fingerprinting overlay matrix, which conveys an unforgeable fingerprint signal vector $\xi=[\xi_p \ \xi_{p+1} \ \ldots \ \xi_{P-1}]_l$ to the receiver, which will be described below.

There are a variety of channel-like OFDM fingerprinting overlay designs that use various amounts of previous channel state information (CSI) to improve fingerprint detection performance. In certain embodiments, however, overlay designs that require zero CSI knowledge, such as a design, can be used. Such designs may feature the lowest $K_{hu,wv}$ computational complexity, may be the simplest to implement, and may require zero CSI feedback overhead. The $K_{hu,wv}$ design is $$K_{hu,wv}[l] = \begin{bmatrix} 0^{(P \times p)} \\ H^{T(P \times P-p)} \end{bmatrix}_{l-\varepsilon}^T \begin{bmatrix} \text{diag}(0^{(p)}, \xi^{(P-p)})^T \\ 0^{(N-P \times P)} \end{bmatrix}_l^T \begin{bmatrix} 0^{(N \times p)} \\ W^{(N \times N-p)} \end{bmatrix}_{l-\varepsilon}^H, \quad (3)$$

where the subscript (hu) on $K_{hu,wv}$ denotes that the columns of the left signaling basis, spreading the fingerprint message in time, are selected from a subset of P−p columns of a Walsh-Hadamard matrix of size $R^{(P \times P)}$, while the subscript (wv) denotes that $W^{(N \times N-p)}$ is created using a subset of N−p columns of a DFT matrix $W \in C^{(N \times N)}$, to spread the fingerprint message in frequency across all subcarriers, p is the effective rank or $\hat{P}[l]$, and P is a design parameter for the size of the block fingerprint such that P>p.

While an advantage of the $K_{hu,hv}[l]$ design is that knowledge of previous CSI and CSI feedback is not required to design the overlay, linear time-varying channel distortions may interfere with the fingerprint signal, since knowledge of such distortions are not considered when designing the left and right spreading bases of the overlay.

However, an unbiased estimate for the fingerprint overlay K[l] can be obtained from the block aggregate channel response $\hat{Q}[l]$ at the receiver.

In certain cases, adversaries may be capable of generating a transmission using the same methods that generate Y[k], and the adversaries may have full knowledge of the fingerprint overlay design and how the fingerprinting function f[k] is applied. However, in certain embodiments the adversaries may not have knowledge of the fingerprint signal vector $[\xi_p \ \xi_{p+1} \ \ldots \ \xi_{P-1}]_l$. Examples for digital multi-bit authentication messages that incorporate cryptographic security features to prevent forgery and reply of the authentication message to be signaled via $[\xi_p \ \xi_{p+1} \ \ldots \ \xi_{P-1}]_l$ are discussed below. Thus, adversaries may be able to mimic all primary user features but may be unable to forge the fingerprint signal vector $[\xi_p \ \xi_{p+1} \ \ldots \ \xi_{P-1}]_l$. When K[k] is designed to sufficiently spread the fingerprint over frequency and time, all signal characterization methods relying on passive features such as cyclostationary behavior, modulation characteristics, signal bandwidth, and spectral shape, may fail when attempting to discern users. Thus, certain embodiments include such spreading over both frequency and time.

Fabrication of an authentic transmission may require forgery of F[k]. Thus, the digital multi-bit authentication message conveyed by $[\xi_p \ \xi_{p+1} \ \ldots \ \xi_{P-1}]_l$ and its associated F[k] can be protected from forgery and replay by using cryptographic primitives and best security design practices, as will be discussed below. Thus, an attack attempting to forge F[k], and an authentic looking fingerprinted transmission Y[k], may not be possible unless the cryptographic keys used to sign the digital multi-bit message conveyed by $[\xi_p \ \xi_{p+1} \ \ldots \ \xi_{P-1}]_l$ are compromised.

The digital multi-bit authentication message conveyed by $[\xi_p \ \xi_{p+1} \ \ldots \ \xi_{P-1}]_l$ can be designed to incorporate self-verifying information about the transmitted signal Y[k], as discussed below. The entire multi-bit message conveyed by $[\xi_p \ \xi_{p+1} \ \ldots \ \xi_{P-1}]_l$ can then be signed using cryptographic keys to authenticate the digital message and the self-verifying information fields. By including self-verifying information in the authentication message, if an adversary were ever to compromise the keys used to sign the digital multi-bit transmission conveyed by $[\xi_p \ \xi_{p+1} \ \ldots \ \xi_{P-1}]_l$, and were able to completely replicate F[k], a forged transmission can be limited to the frequencies and times prescribed by the compromised key, since any deviation in these parameters would reveal the transmission of forgery.

To modulate a multi-bit digital authentication message, the elements $[\xi_p \ \xi_{p+1} \ \ldots \ \xi_{P-1}]_l$ can be selected by the transmitter as symbols from a typical Pulse Amplitude Modulation (PAM) signal constellation, and using an appropriate bit-to-symbol mapping the receiver can recover the digital authentication message from $[\xi_p \ \xi_{p+1} \ \ldots \ \xi_{P-1}]_l$ after extracting these statistics. While the vector $[\xi_p \ \xi_{p+1} \ \ldots \ \xi_{P-1}]_l$ may only be P−p symbols long, the concatenation a number of consecutive vectors over ω fingerprinted blocks will yield a digital authentication message of length Q=ω (P−p) symbols long. For example, for the values P=128, p=8, ω=10 a digital authentication message of Q=1200 bits can be employed. Recovery of the fingerprint signal vector $[\xi_p \ \xi_{p+1} \ \ldots \ \xi_{P-1}]$ at the receiver can be performed, where, for example, the receiver projects the received equalizer channel estimate data onto the left and right signaling bases, $[0 \ U_2]_{l-\epsilon}^H$ and $[0 \ V_2]_{l-\epsilon}$, respectively, to de-spread the fingerprint signal.

To address the needs of DSA applications (or for other purposes, with addressing the needs of DSA applications being one example of a purpose), the digital authentication message embedded in each node's transmission can be configured to contain basic self-verifying information such as the frequency, location, and time the signal is authorized for transmission. These fields can be denoted as F, L, and T, respectively. A message hash of these parameters can then be digitally signed using a secret key owned by the transmitter and included in the message, while a timestamp denoted TS can also be included with the authentication message to prevent future replay of the message by malicious users. The timestamp can allow for the enforcement of an expiration deadline on the content of the message, and in the event an authentication message is received with a timestamp that has passed the expiration deadline, it can be discarded by the receiver. The authentication message for a primary user, $U_j$, denoted $msg_{U_j,A}$, can be given as $$msg_{U_j,A} = \{TS, F, L, T, K_A^+, [Hash_m(TS, F, L, T)]_{K_A}\}, \quad (5)$$

where $[\bullet]_{K_A}$ is a digital signature of the content within $[\bullet]$ using the private key owned by the primary user group, the subscript A is used to denote that user $U_j$ is a member of the primary user group A, $K_A^+$ is the public key of the primary user's group, and $Hash_m[\bullet]$ is message digest of length m for the content within $[\bullet]$.

The hash algorithm $Hash_m[\bullet]$ can be, for example, any suitable collision-resistant hash algorithm, such as MD5 or SHA-1, which may provide reasonable security against malicious fabrication of messages. Depending on the details of the DSA application, an authentication message could be established for secondary users, or to reduce the implementation complexity of secondary user transmitters the fingerprint message F[k] could be omitted entirely from secondary user transmissions and thus any transmission that does not contain a valid primary user fingerprint can be classified as being from a secondary user.

To decode the authentication message (it should be noted that certain embodiments are directed to decoding the authentication message in a manner that is generally the reverse of encoding the authentication message), the receiver can first recover the embedded multi-bit digital fingerprint message and then extract parameters from the payload of the message. Once each field has been extracted, the authenticity of the primary user group's public key, $K_A^+$, can be verified from a mutually accepted trust anchor or certificate authority (CA). The receiver can then independently verify $[Hash_m[TS, F, L, T]]_{K_A}$ using the primary user group's public key, $K_A^+$, which is embedded in the authentication message. Malicious forgery of the authentication message can be prevented through the signature process, and by including this signature as part of the authentication message. The modification of any subset of the authentication message parameters TS, F, L, and T, would cause the message signature to fail validation when it is received, enabling the receiver to detect and discard modified messages.

If the authenticity of $K_A^+$ and the message signature are both deemed valid, and the operating signal is within the specifications of F, L, and T, the transmitting user can then be recognized as a primary user. This authentication messaging system may rely on the existence of a trust anchor, sometimes referred to as a Certificate Authority (CA), to verify the authenticity of $K_A^+$. While primary users in the PUA scenario posed by IEEE 802.22 are digital television transmissions adhering to the American Television Standards Committee (ATSC) specification, which does not use OFDM signaling, DSA applications employing OFDM can be similarly enhanced.

While an authentication message, such as discussed above, can provide a mechanism for nodes within an established system to differentiate transmissions by users of various roles, it may not address initial network entry, also known as the bootstrapping problem, that exists when a new user needs to enter the system for the first time. While, in practice, wireless networks with any number of user roles are possible, for the sake of simple discussion is limited here to a two-role wireless network including a group of primary users, a group of secondary user nodes, and a designated CA. A secure system addressing the bootstrapping problem can provide a mechanism for nodes to securely enter the network as a member of one of these two groups. To ensure that the system is highly available, the bootstrapping mechanism can allow new nodes to enter into the network via a number of points of access.

An alternative is a replicated bootstrapping service, where a percentage of nodes within the network are designated as trusted bootstrapping agents, and are allowed to bootstrap new nodes into the network. The group of bootstrapping agents can be denoted as $Q_i$, i=0, . . . , $Q_N$, where $Q_N$ is the number of bootstrapping agents distributed throughout the network. $Q_i$ may have been vetted by the network and CA, and may be trusted agents for facilitating initial network entry. When a new network node, $U_j$, attempts to enter the network for the first time as a primary user, it can first send a bootstrapping broadcast request to locate one of the bootstrapping agents. To locate a bootstrapping agent, $U_j$ can send a broadcast message, denoted $boot_{U_j,A}$, which is given as $$boot_{U_j,A} = \{[A, U_j, T, K_A + (RP, K_{U_j,A})]_{U_j}, [U_j, K_{U_j}^+]_{CA},\} \quad (6)$$

where the subscript A denotes that the user $U_j$ is attempting to join the primary usergroup, T is a message timestamp designed to establish an expiration deadline to validate the message, $[\bullet]_{CA}$ denotes that the enclosed fields have been signed by the CA, $K_{U_j,A}$ is the shared key that $U_j$ wants to securely transmit to the group, and RP is a secret Replay Pad that will be used by $Q_i$ to encrypt $K_{U_j,A}$ in subsequent messages. The $[U_j, K_{U_j}^+]_{CA}$ component can become a certificate denoting that the group's trust anchor has verified the authenticity of $U_j$'s public key.

In this example, basic message $K_A^+(RP, K_{U_j,A})$ can denote that the relay pad RP and $U_j$'s primary user shared key $K_{U_j,A}$ have been encrypted with the primary user's group public key $K_A^+$, therefore only the group's private key $K_A^-$ can decrypt these fields. By encrypting this message using the group's public key, node $U_j$ can be protected from malicious key exchange attacks, where an attacker poses as an authentic bootstrapping node. The following steps of the bootstrapping process can securely convey $K_A^-$ to the joining user, allowing $U_j$ to decrypt and use $K_A^-$ in future transmissions.

When one of the bootstrapping nodes, $Q_i$, eventually receives a bootstrapping request and verifies that $U_j$ is allowed to join group A, it can respond to node $U_j$ and proceed to the next step of the bootstrapping process. The reply message sent by $Q_i$, denoted $bootreply_{Q_i,U_j}$, can become $$bootreply_{Q_i,U_j} = [U_j, NCK_A \oplus RP, CK_A(K_A^-)_{Q_i}] \quad (7)$$

where N is a nonce, or a randomly generated piece of information, $CK_A$ is the group's shared secret which will be used to encrypt the primary user group's private key, $K_A^-$ is the primary user's group's private key, $CK_A \oplus RP$ denotes that the group's shared secret $CK_A$ has been xor'ed with the replay pad RP, and $[\bullet]_{Q_i}$ denotes that the enclosed fields have been signed with $Q_i$'s private certificate. By applying the xor operation to $CK_A$ and RP, $Q_i$ can securely transmit the group shared secret $CK_A$ to $U_j$. The nonce N will be used in subsequent transmissions to verify that $U_j$ has successfully decrypted $K_A^-$.

Once $U_j$ receives the $bootreply_{Q_i,U_j}$ message, it can use the RP which it has secretly retained to recover the group shared secret $CK_A$. After $CK_A$ has been recovered, node $U_j$ can use the group's shared secret to decrypt the group's private key $K_A^-$, which it will use in future group communications. To notify that $Q_i$ that the $bootreply_{Q_i,U_j}$ has been successfully processed, $U_j$ will send the final confirmation message, $bootconfirm_{U_j,Q_i}$, to $Q_i$, for example, $$bootconfirm_{U_j,Q_i} = K_{U_j,A}(N), \quad (8)$$

which can simply be the nonce N from the $bootreply_{Q_i,U_j}$ message encrypted with $U_j$'s primary usershared key, $K_{U_j,A}$, which $Q_i$ has had in its possession since the $boot_{U_j,A}$ message. After receiving this message, $Q_i$ can decrypt the nonce, and can compare it to the value N, which it sent to $U_j$, as described above. If the two values match, $Q_i$ now has confirmation that $U_j$ has successfully joined the group.

The use of the nonce can tie $U_j$'s confirm message, $bootconfirm_{U_j,Q_i}$, to $bootreply_{Q_i,U_j}$, and together with use of the replay pad between the $boot_{U_j,A}$ and $bootreply_{Q_i,U_j}$ all of the messages in the exchange are tied together as one authentic bootstrapping session.

Using the given secure group entry method, any number of groups representing various roles in a DSA theater could be derived. For the two role system, another secondary user group UA could be created, in addition to the primary user group A in the previous example.

To be considered secure, cryptographic protocols may need to be robust against forgery, modification, deletion, and replay. Since a broadcast authentication system is being considered, in which every user is able to decode and subsequently verify the fingerprint message, various ideas of privacy may be inapplicable since it may be desirable for every user to have the ability to extract the authentication message.

Provided the hashing algorithm used is collision-resistant, forgery may be rendered impossible. Modification of $msg_{U_j,A}$ and the self-verifying fields may be prevented through use of the signature itself. If any of the fields, TS, F, L, T, or $K_A$ are changed, then the signed hash may no longer be valid. By leveraging proven cryptographic primitives in the design of keys, message signatures, and message hashes, the probability of making an authentication error may be reduced to the probability of a hash collision. A hash algorithm such as SHA-1 will feature a collision probability which is nearly zero in all practical applications, thus preventing the acceptance of incorrect authentication messages. For example, when using a 64-bit message hash, a malicious node would require approximately $5.1 \times 10^9$ attempts to achieve one collision using a brute force 'birthday' attack. At least a 256-bit hash may be used, such as SHA-256, further decreasing the probability of an authentication error and making the probability of accepting a forgery in the unlikely event an attacker were to fabricate a hash collision, virtually impossible.

Since the authentication message $msg_{U_j,A}$ may be transmitted as a multi-bit digital signal, the probability of a fingerprint detection miss may be the same as the probability of receiving the entire authentication message with one or more bit errors. Since a single bit error in either the authentication message or the signature can cause the authentication to fail, the probability of missing the authentication message may be the same as the probability of at least one bit error in the message. Therefore for an uncoded binary transmission, the probability that the received authentication message is received in error may simply be $$P[\hat{msg}_{U_j,A} \neq msg_{U_j,A}] = 1 - (1-P_e)^{M+N}, \quad (9)$$

where $P_e$ is the probability of a bit error in the authentication signal, $M = \text{length}\{TS,F,L,T\}$ and $N = \text{length}\{[Hash_m[TS,F,L,T]]_{K_A}\}$. The use of forward error correction (FEC) on the authentication signal, combined with a continuously repeated message (for example, repetition encoding), can further decrease the probability of an authentication miss.

The authentication message in $msg_{U_j,A}$ can also include the frequency F that the transmitter is allowed to transmit on, which may be associated with the transmitter's key and recorded by a CA like the FCC. Therefore even if an adversary can compromise a primary user's key and forge F[k] at the PHY-layer, the attacker may be constrained to the frequency or frequencies prescribed by the compromised key. Using a forged F[k] on a frequency other than the original frequency prescribed by the key can reveal that the transmission is a forgery when validating the credentials of the key against the CA's records.

In the secure group entry method discussed above, the authenticity of messages may be guaranteed using signatures and shared keys, while session coherence and replay attacks are prevented through the use of the replay pad and nonce.

Simulation results for the $K_{hu,wv}$ fingerprint overlay design given above, using an intrinsic time-varying channel model are discussed by way of illustration. Through simulation quantitative comparison of the detection performance for primary and secondary user signals in complex time-varying channels may be possible. Likewise, the simulation can help to measure any degradation experienced by each user's signal due to the presence of the embedded fingerprint. To measure user signal degradation, the BERs of the primary signal are compared with and without the fingerprint present.

To simulate the embedding of both user fingerprint signals, a full OFDM system and accompanying channel simulator were created in Matlab. The generated OFDM signal uses a 512-point FFT with 430 occupied subcarriers and 41 left and right guard subcarriers. A BPSK-modulated preamble occupies the first symbol of each frame using a 2× time-domain repetition, while the following payload symbols are modulated using QPSK. To allow for periodic sampling of the intrinsic channel response, an odd-even differential modulation scheme was used, where odd frames are fingerprinted and even frames are left unfingerprinted to aid in channel sounding; a process that may be required to measure and reverse distortions of the intrinsic time-varying channel.

Each OFDM frame was then subjected to a simulated time-varying channel by applying g(t) in the time domain using a transversal filter Timing jitter was also added to test the fingerprint's effect on typical frame synchronization algorithms, and the Schmidl and Cox algorithm was used for course timing recovery. The LS channel estimator was applied to estimate the aggregate channel distortion using the frame preamble as training data, and the resulting estimate was then up-sampled using 2× sinc interpolation.

A number of channel estimation techniques have been considered for OFDM systems, including the minimum mean-squared error (MMSE) estimator, and the least-squares (LS) estimator. A least-square (LS) channel estimator was used in this example.

The channel sounding symbol and fingerprinted symbol were then equalized independently, and $\hat{q}[l-\epsilon]$ and $\hat{h}[l]$ were recorded for each frame for later use during the fingerprint recovery phase. Both the BPSK preamble data and QPSK payload data can be demodulated into bits, and the bit errors for fingerprinted and non-fingerprinted frames were recorded.

A DSA system was modeled using the two-node model consisting of primary and secondary users. Primary users, in this simulation, embed the message $msg_{P_j,A}$, $j=1, \ldots, N_A$ into their transmission, where $N_A$ are the number of users in the primary user's group A, while secondary user's embed $msg_{P_k,U}$, $k=1, \ldots, N_U$ into their transmission, where $N_U$ is the number of users in the secondary user group. Two other model parameters, namely the fingerprint strength, denoted $\lambda$, and the excitation noise variance of the time-varying channel process, $\sigma_T$, are also possible.

In consideration of a worst-case PUE attack scenario, all other aspects of both the primary user and secondary user's transmissions, such as the number of subcarriers, the bandwidth of the transmission, signal strength, modulation details, and preamble structure, are identical, while the exact contents of the multi-bit digital fingerprint message transmitted by each user is different and assumed to be unknown by the opposing group.

It was assumed that secure group assignment has been performed, therefore cryptographic keys have been securely transferred such that secondary users cannot fabricate a primary user's message, and vice-versa. While a message containing all fields might be several hundred bits long, for the sake of discussion both the primary user message, $msg_{U_j,A}$, and the secondary user message, $msg_{U_k,UA}$, can be selected to be $Q = 224$ bit sequences generated by a pseudo-random number (PN) generator, therefore making both messages completely uncorrelated PN sequences.

To correctly detect either $msg_{P_j,A}$ or $msg_{P_k,UA}$ (here, P is used, though U may be used instead) the entire 224 bit sequence may be required to be received without bit errors, while reception of a message with at least one bit error will constitute a detection miss. While longer authentication messages may require use of forward error correction (FEC) to ensure that the entire message is received without bit errors, FEC was not considered in our simulations. The BER plots for the fingerprinted signal with and without the fingerprint present, for fingerprint strength values $\lambda = [2, 6]$ and time-varying channel excitation noise variance $\sigma_T = 0.001$, are depicted in FIG. 1 along with the BER of the authentication fingerprint signal. From FIG. 1 it can be observed that the authentication signal is received with a substantial BER advantage over the user signal, and that this advantage increases with the strength of the fingerprint, for example as $\lambda$ increases.

Figure 2:
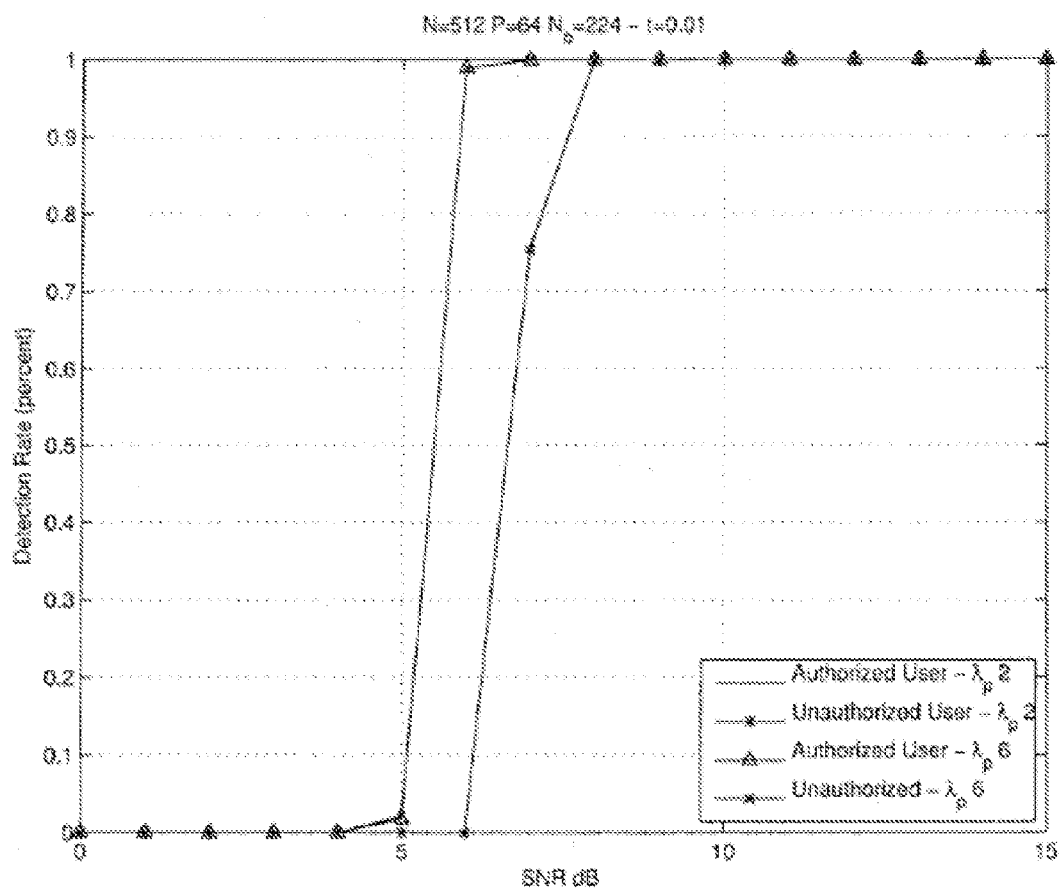
FIG. 2 illustrates detection rate of primary and secondary users for various $\lambda_i$, (overlapping series), according to certain embodiments.

Detection performance for the 224 bit authentication message transmitted by both the primary and secondary users is depicted in FIG. 2, for values of $\lambda = [2, 6]$. For comparison, the message detection performance for a message of the same length sent via the payload of the OFDM signal is also include. It can be observed from FIG. 2 that the detection performance for both users is identical, as the series for the primary and secondary users are completely overlapping for both values of λ. It can also be observed that the detection performance increases with respect to λ, and that increasing the strength of the fingerprint, by increasing λ, allows the fingerprint to be detected in lower SNR. From FIG. 2 it can be seen that the threshold between the 0% detection rate and 100% detection rate is very steep, and that this threshold occurs between 5 and 7 dB SNR, for the values of λ chosen. This proves that the signal can be authenticated nearly 100 percent of the time, in SNR conditions as low as 6-7 dB. Additionally it can be observed that the authentication message sent using fingerprint embedding outperforms a similar message sent via the payload of the signal by a margin of nearly 5 dB.

For comparison, the message detection rate results of FIG. 2 can be plotted with predicted message detection results based on the BER of the authentication signal using (9). From these results it can be observed that the simulated detection rates are very close to those predicted using BER rates.

Figure 3:
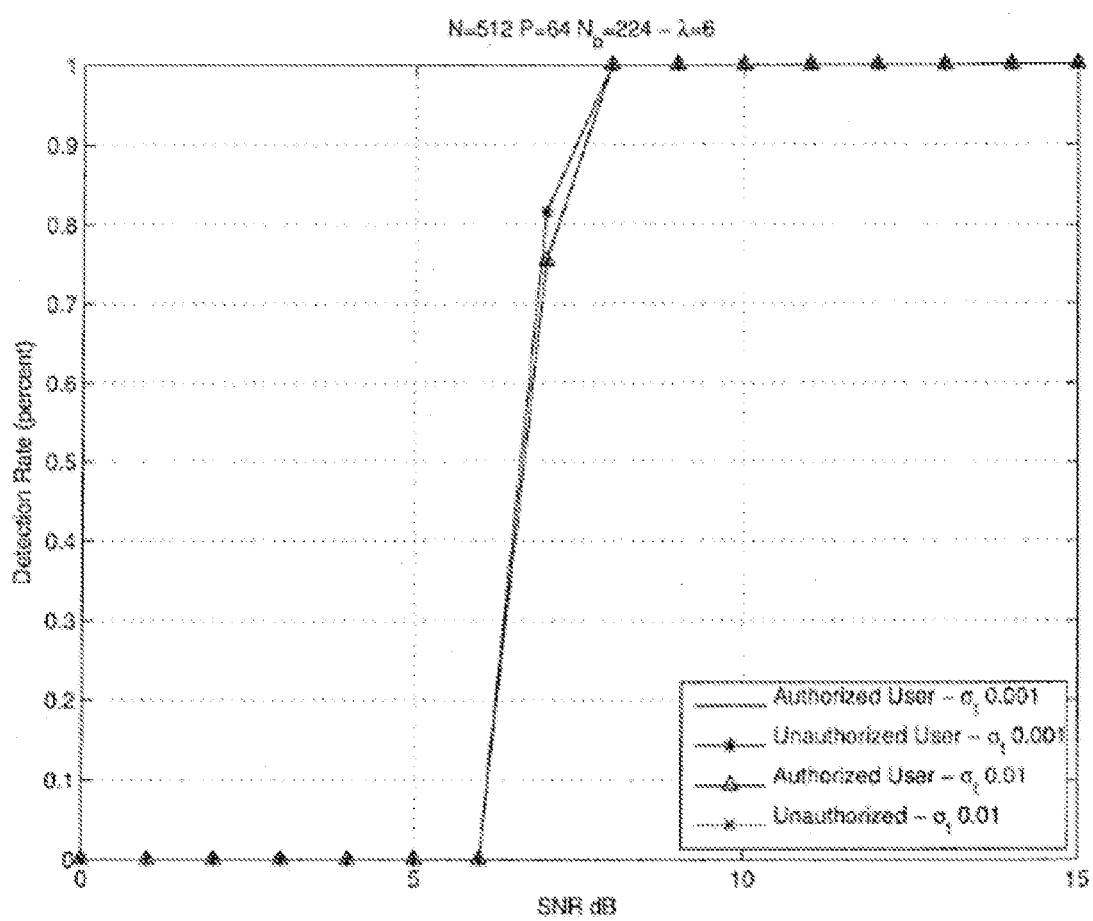
FIG. 3 illustrates detection rate of primary and secondary users for various $\sigma_t$, (overlapping series), according to certain embodiments.

Detection performance for both user messages is also depicted in FIG. 3, for values of $\sigma_T$=[0.001, 0.01]. From FIG. 3 it can be seen that the detection performance for both users is again identical, as the series for the primary and secondary users are completely overlapping for both values of $\sigma_T$, and it can also be observed that the detection performance is relatively invariant of $\sigma_T$, for the values of chosen. It can be observed from FIG. 3 that the threshold between the 0% detection rate and 100% detection rate is again very steep, and that this threshold occurs at 6 dB SNR, for both values of $\sigma_T$. The message detection performance is again included for a message of the same length sent via the payload of the OFDM signal, and it can be noted that in this case the fingerprint authentication message detection rate outperforms the payload authentication message by 4 dB.

The message detection rate results of FIG. 3 can be plotted with predicted message detection results based on BER, it can be observed that the simulated detection rates are also very close to the predicted values.

The above provides a discussion of a holistic authentication system for OFDM wireless transmissions that leverages channel-like fingerprint embedding techniques. The basic embedding approach can be extended by considering a digital authentication message for a dual-role system, to illustrate certain embodiments. Additionally, the bootstrapping issue was addressed by presenting a mechanism for providing secure group entry. A detailed analysis of security features of the authentication message, and the secure group entry messages, were discussed. Simulation results were presented for detecting the authentication fingerprint message for the two-role system. The simulation results demonstrate that certain embodiments of an authentication scheme can achieve 99.99 percent detection accuracy and 100 percent classification accuracy, with SNR as low as 5-6 dB.

A paper, "Extrinsic Channel-like Fingerprint Embedding for Authenticating MIMO Systems," published in IEEE Transactions on Wireless Communications, Volume: 10, Issue: 12, Pages: 4270-4281 (which is hereby incorporated herein by reference in its entirety) provides a further illustration of certain embodiments. As discussed therein, a fingerprinting function at the physical layer can be applied in such a way that an unaware, regular, unmodified MIMO receiver will ignore the fingerprint signal and employ traditional channel equalization and data detection. On the other hand, an aware receiver can be configured to detect and decode the fingerprint in addition to the primary signal. Also, as discussed therein, fingerprinting scenarios can include, among other things, antenna amplitude modulation (AAM) and antenna phase modulation (APM).

"Channel-Like Fingerprinting Overlays for Authenticating OFDM Signals Using Channel Side Information," found at pages 56-64 of the Provisional application provides additional example embodiments, and is incorporated herein by reference in its entirety. As discussed therein, a wireless fingerprint embedding scheme can use, for example, side information of a previous channel state to create a high performance footprint.

Likewise, "Extrinsic Channel-Like Fingerprinting Overlays Using Channel Side-Information," found at pages 3-40 of the Provisional application provides additional example embodiments, and is incorporated herein by reference in its entirety. As discussed therein, previous channel state information can be incorporated into the design of a fingerprint or watermark.

The above brief descriptions should not be taken as limiting. Instead, they merely highlight some of the discussions in these documents that have each been incorporated in their entirety herein by reference, including the figures contained therein.

Figure 4:
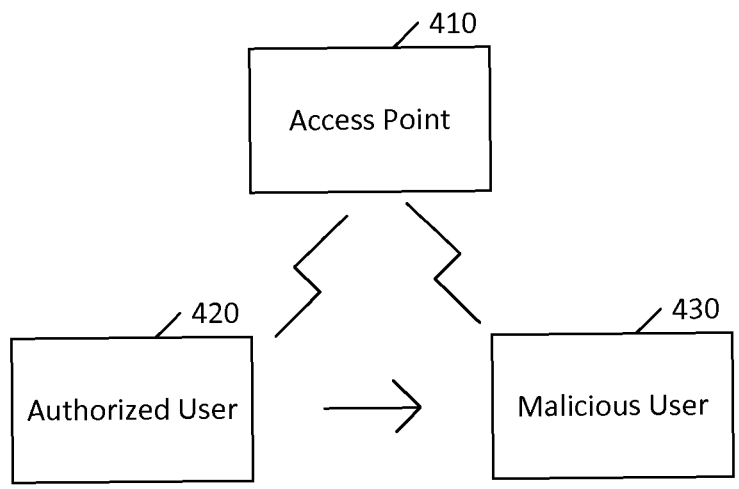
FIG. 4 illustrates a network according to certain embodiments.

FIG. 4 illustrates a network according to certain embodiments. As shown in FIG. 4, a network can include an access point 410, providing access control to some spectrum or other radio frequency resources. An authorized user 420 can communicate wirelessly with the access point and can provide an authentication watermark with the signal. This authentication watermark can be based on specific characteristics of the device of the authorized user, particularly with respect to channel effects. The channel effects between the authorized user 420 and the malicious user 430 may be different from the channel effects between the authorized user 420 and the access point 410. Thus, it may be difficult for the malicious user to accurately reproduce the watermarked signal. Moreover, even if the malicious user precisely duplicates the watermarked signal of the authorized user 420, countermeasures such as encrypting a time stamp with a private key can be used to prevent such playback attacks. Other information security techniques overlaying the physical layer watermarking are also permitted.

Figure 5:
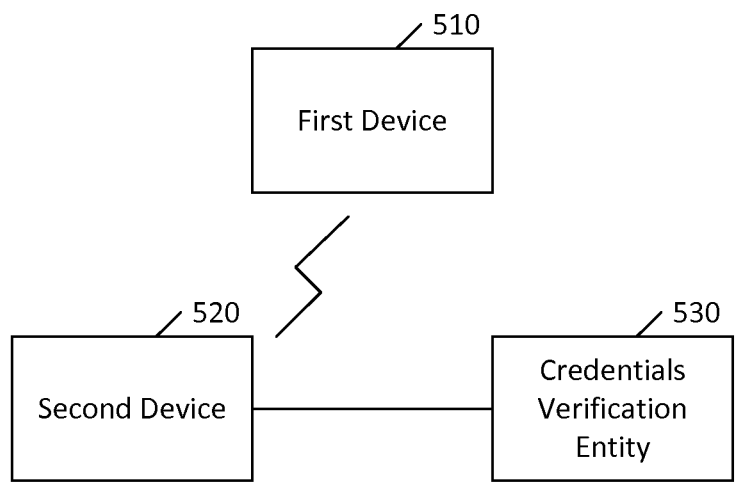
FIG. 5 illustrates another network according to certain embodiments.

FIG. 5 illustrates another network according to certain embodiments. As shown in FIG. 5, a first device 510 can wirelessly transmit a signal to the second device 520. The second device 520 can decode a watermark set of credentials from the first device 510 and can verify the credentials using a credentials verification entity 530. The connection to the credentials verification entity 530 is shown as a wired connection. However, the wired connection in FIG. 5 can be substituted by a wireless or hybrid connection and likewise the wireless connection in FIG. 5 can be substituted by a wired or hybrid connection.

Figure 6:
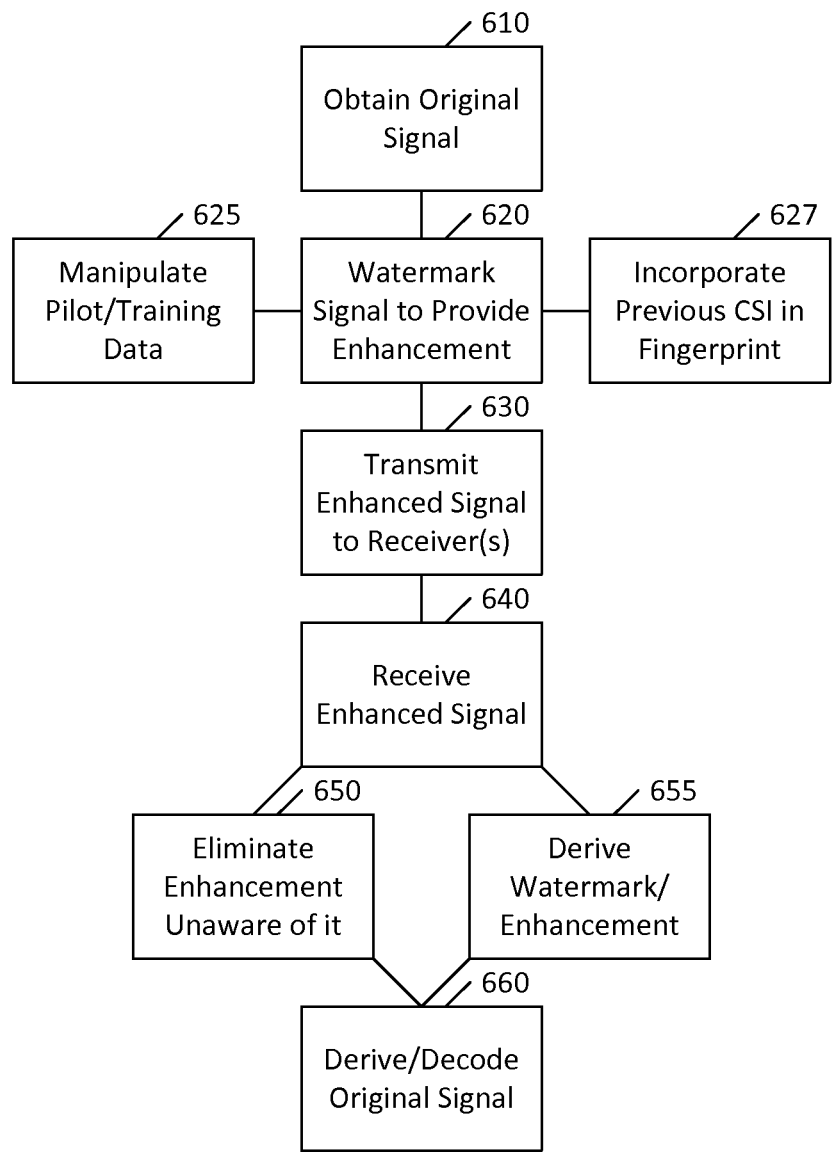
FIG. 6 illustrates a method according to certain embodiments.

FIG. 6 illustrates a method according to certain embodiments. The method can be performed by a device, such as a user equipment, an access point, or other device. As shown in FIG. 6, a method can include, at 610, obtaining an original signal to be transmitted to at least one receiver. The signal can be obtained by being received from another module, unit, or layer. Alternatively, the signal can be obtained by being generated by the device performing the method.

The method can also include, at 620, watermarking the original signal with at least one of authentication data or ancillary data to provide an enhanced signal. The watermarking can include a physical layer watermark. The physical layer watermark can be configured to emulate at least one a channel effect or a receiver distortion.

The watermark can be configured to emulate multipath. Moreover, the watermark can include a fingerprint that includes at least one dimension of time, frequency, and space. In certain embodiments, the fingerprint includes two or all three of those dimensions. The fingerprint, however, is not limited to those dimensions.

The watermarking can include manipulating, at 625, at least one of training data or a pilot signal. The physical layer watermark can be configured to be eliminated by an unaware receiver's physical layer processing.

The watermarking can include incorporating, at 627, previous channel state information into a fingerprint. The watermark is configured not to be present in the original signal after decoding the enhanced signal. The watermark can include an emulation of a time-varying channel distortion.

Moreover, the watermark can be configured to convey credentials of an authorized user. For example, the watermark can be configured to provide an access authentication for a dynamic spectrum access application. The watermark can also be configured to provide explicit authentication in an active sensing authentication in the at least one receiver.

The method can further include, at 630, transmitting the enhanced signal to the at least one receiver. The transmitting can include, for example, transmitting a wireless signal. More specifically, the transmitting can include transmitting according to at least one of code division multiple access, frequency division multiple access, orthogonal frequency division multiple access, time division multiple access, point-to-point access, or multiple input multiple output. For example, the transmission can be a broadcast transmission.

The method can also include, at 640, at receiving the enhanced signal, which may be an authentication signal. The method can include, at 650, eliminating the physical layer watermark by an unaware receiver's physical layer processing.

The method can additionally include deriving, at 655, the enhanced signal by an aware receiver. The method can further include, at 660, deriving the original signal, such as by decoding the original signal. The watermark can be configured not to be present in the original signal after decoding the enhanced signal.

The process of deriving and decoding the signals can follow a reverse path to the path used for encoding the signals. Other ways of handling the signals is also permitted.

Figure 7:
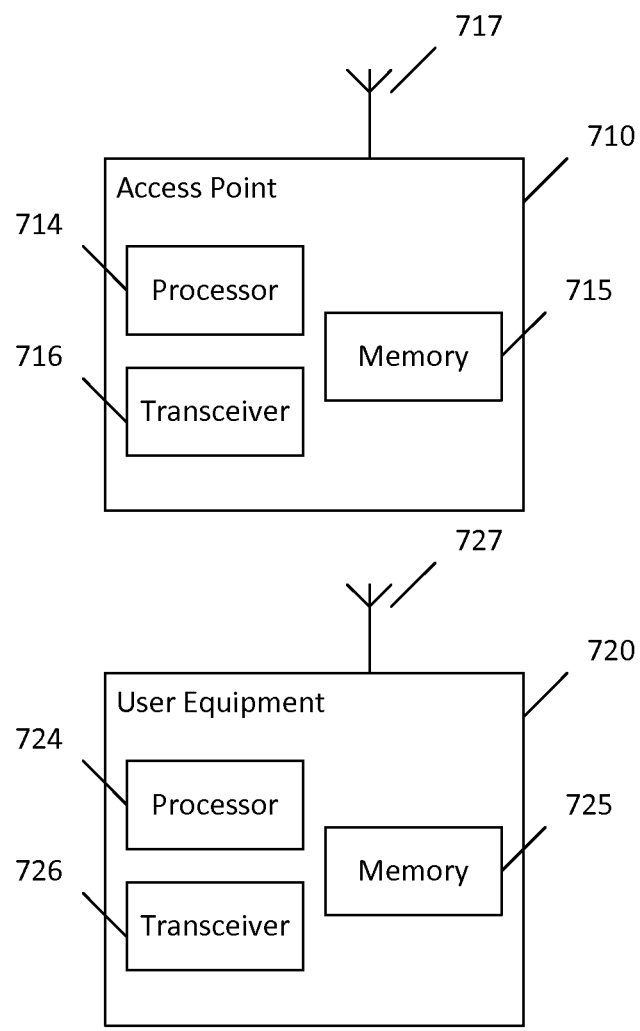
FIG. 7 illustrates a system according to certain embodiments.

FIG. 7 illustrates a system according to certain embodiments of the invention. In one embodiment, a system may comprise several devices, such as, for example, access point 710 and user equipment (UE) 720. Other devices, such as a TV station broadcast tower, a satellite, or other transmitters can be included or substituted for the devices shown. Thus, the shown devices are merely for purposes of illustration. The system may comprise more than one UE 720 and more than one access point 710, although only one of each is shown for the purposes of illustration. The system may also involve only at least two UEs 720 or only at least two access points 710. An access point can be a base station, eNode B (eNB), or other network access element. Each of these devices may comprise at least one processor, respectively indicated as 714 and 724. At least one memory may be provided in each device, and indicated as 715 and 725, respectively. The memory may comprise computer program instructions or computer code contained therein. One or more transceiver 716 and 726 may be provided, and each device may also comprise an antenna, respectively illustrated as 717 and 727. Although only one antenna each is shown, many antennas and multiple antenna elements may be provided to each of the devices. For example, the devices may be configured for multiple-input multiple-output transmission.

Other configurations of these devices, for example, may be provided. For example, access point 710 and UE 720 may be additionally configured for wired communication, in addition to wireless communication, and in such a case antennas 717 and 727 may illustrate any form of communication hardware, without being limited to merely an antenna.

Transceivers 716 and 726 may each, independently, be a transmitter, a receiver, or both a transmitter and a receiver, or a unit or device that may be configured both for transmission and reception.

Processors 714 and 724 may be embodied by any computational or data processing device, such as a central processing unit (CPU), application specific integrated circuit (ASIC), field programmable gate array (FPGA), or comparable device. The processors may be implemented as a single controller, or a plurality of controllers or processors. Multiple core processors are, for example, permitted.

Memories 715 and 725 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language.

The memory and the computer program instructions may be configured, with the processor for the particular device, to cause a hardware apparatus such as access point 710 and UE 720, to perform any of the processes described above (see, for example, FIG. 6). Therefore, in certain embodiments, a non-transitory computer-readable medium may be encoded with computer instructions that, when executed in hardware, may perform a process such as one of the processes described herein. Alternatively, certain embodiments of the invention may be performed entirely in hardware.

Furthermore, although FIG. 7 illustrates a system including an access point 710 and a UE 720, embodiments of the invention may be applicable to other configurations, and configurations involving additional elements, as illustrated and discussed herein (see, for example, FIGS. 4 and 5). For example, multiple user equipment devices and multiple access points may be present, or other nodes providing similar functionality, such as relays which may receive data from an access point and forward the data to a UE and may implement both functionality of the UE and functionality of the access point.

Thus, an apparatus may include at least one memory including computer program code and at least one processor. The at least one memory and computer program code can be configured to, with the at least one processor, cause the apparatus at least to perform one or more of the methods described here, such as the methods shown in FIG. 6 or performed by any of the devices illustrated in FIGS. 4 and 5.

Numerous embodiments to the above configurations are permitted. For example, the methods disclosed herein and incorporated herein by reference may be practiced individually or in combination with one another. Moreover, the methods disclosed herein and incorporated herein by reference herein can be combined with one another. For example, data security or privacy techniques can be applied to a physical layer watermark to conceal, protect, or obscure the information content of the watermark. Certain embodiments may include the watermark generated according to the process described herein and either stored in a tangible medium or transmitted.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
obtaining, at a device, an original signal to be transmitted to at least one receiver;
watermarking, by the device, the original signal with at least one of authentication data or ancillary data to provide an enhanced signal, wherein the watermarking comprises a physical layer watermark, wherein the physical layer watermark is configured to mimic at least one of a channel effect or a receiver distortion, wherein the physical layer watermark is configured to identify a transmitter of the original signal; and
transmitting, by the device, the enhanced signal to the at least one receiver, wherein the physical layer watermark is configured to have a bit error rate lower than the original signal,
wherein the physical layer watermark is configured to be automatically eliminated by physical layer processing by a receiver that is not configured to extract the physical layer watermark, wherein the receiver that is not configured to extract the physical watermark will ignore the physical layer watermark and employ traditional channel equalization and data detection on the original signal, and wherein a receiver that is configured to extract the physical watermark will process the physical layer watermark in addition to employing traditional channel equalization and data detection on the original signal.

2. The method of claim 1, wherein the transmitting comprises transmitting a wireless signal.

3. The method of claim 2, wherein the transmitting comprises transmitting according to at least one of code division multiple access, frequency division multiple access, orthogonal frequency division multiple access, time division multiple access, point-to-point access, or multiple input multiple output.

4. The method of claim 1, wherein the watermark is configured to mimic multipath.

5. The method of claim 1, wherein the watermark comprises a fingerprint that includes at least one dimension of time, frequency, and space.

6. The method of claim 1, wherein the watermarking comprises manipulating at least one of training data or a pilot signal.

7. The method of claim 1, wherein the physical layer watermark is configured to contain information that can be authenticated with a public key.

8. The method of claim 1, wherein the watermarking comprises incorporating previous channel state information into a fingerprint.

9. The method of claim 1, wherein the watermark is configured not to be present in the original signal after decoding the enhanced signal.

10. The method of claim 1, wherein the watermark comprises an imitation of a time-varying channel distortion.

11. The method of claim 1, wherein the watermark is configured to convey credentials of an authorized user.

12. The method of claim 1, wherein the watermark is configured to provide an access authentication for a dynamic spectrum access application.

13. The method of claim 1, wherein the watermark is configured to provide explicit authentication in an active sensing authentication in the at least one receiver.

14. An apparatus, comprising:
at least one memory including computer program code; and
at least one processor,
wherein the at least one memory and computer program code are configured to, with the at least one processor, cause the apparatus at least to
obtain an original signal to be transmitted to at least one receiver;
watermark the original signal with at least one of authentication data or ancillary data to provide an enhanced signal, wherein watermarking the original signal comprises applying a physical layer watermark, wherein the physical layer watermark is configured to mimic at least one of a channel effect or a receiver distortion, wherein the physical layer watermark is configured to identify a transmitter of the original signal; and
transmit the enhanced signal to the at least one receiver, wherein the physical layer watermark is configured to have a bit error rate lower than the original signal,
wherein the physical layer watermark is configured to be automatically eliminated by physical layer processing by a receiver that is not configured to extract the physical layer watermark, wherein the receiver that is not configured to extract the physical watermark will ignore the physical layer watermark and employ traditional channel equalization and data detection on the original signal, and wherein a receiver that is configured to extract the physical watermark will process the physical layer watermark in addition to employing traditional channel equalization and data detection on the original signal.

15. The apparatus according to claim 14, wherein the watermark comprises a fingerprint that includes at least one dimension of time, frequency, and space.

16. The apparatus according to claim 14, wherein the at least one memory and computer program code are configured to, with the at least one processor, cause the apparatus at least to provide the watermark by manipulating at least one of training data or a pilot signal.

17. The apparatus according to claim 14, wherein the physical layer watermark is configured to contain information that can be authenticated with a public key.

18. The apparatus according to claim 14, wherein the at least one memory and computer program code are configured to, with the at least one processor, cause the apparatus at least to provide the watermark by incorporating previous channel state information into a fingerprint.

19. The apparatus according to claim 14, wherein the watermark comprises an imitation of a time-varying channel distortion.

20. The apparatus according to claim 14, wherein the watermark is configured to convey credentials of an authorized user.

21. The apparatus according to claim 14, wherein the watermark is configured to provide an access authentication for a dynamic spectrum access application.

22. The apparatus according to claim 14, wherein the watermark is configured to provide explicit authentication in an active sensing authentication in the at least one receiver.

23. A non-transitory computer-readable medium, encoded with instructions that, when executed in hardware, perform a process, the process comprising:
obtaining an original signal to be transmitted to at least one receiver;
watermarking the original signal with at least one of authentication data or ancillary data to provide an enhanced signal, wherein the watermarking comprises a physical layer watermark, wherein the physical layer watermark is configured to mimic at least one of a channel effect or a receiver distortion, wherein the physical layer watermark is configured to identify a transmitter of the original signal; and
transmitting the enhanced signal to at least one receiver, wherein the physical layer watermark is configured to have a bit error rate lower than the original signal,
wherein the physical layer watermark is configured to be automatically eliminated by physical layer processing by a receiver that is not configured to extract the physical layer watermark, wherein the receiver that is not configured to extract the physical watermark will ignore the physical layer watermark and employ traditional channel equalization and data detection on the original signal, and wherein a receiver that is configured to extract the physical watermark will process the physical layer watermark in addition to employing traditional channel equalization and data detection on the original signal.

* * * * *